(12) United States Patent
Gao et al.

(10) Patent No.: US 9,350,198 B2
(45) Date of Patent: May 24, 2016

(54) ACTIVE VOLTAGE BALANCING OF SERIES CAPACITOR ARRANGEMENT

(71) Applicant: AgigA Tech Inc., San Diego, CA (US)

(72) Inventors: Rupeng Gao, Qionglai (CN); Ying Cai, Chengdu (CN)

(73) Assignee: AgigA Tech Inc., San Diego, CA (US)

( * ) Notice: Subject to any disclaimer, the term of this patent is extended or adjusted under 35 U.S.C. 154(b) by 532 days.

(21) Appl. No.: 13/678,607

(22) Filed: Nov. 16, 2012

(65) Prior Publication Data

US 2014/0139186 A1 May 22, 2014

(51) Int. Cl.
*H02J 7/00* (2006.01)
*H02J 7/34* (2006.01)

(52) U.S. Cl.
CPC .............. *H02J 7/345* (2013.01); *H02J 7/0016* (2013.01)

(58) Field of Classification Search
CPC ...... H02J 7/0016; H02J 7/0018; Y02E 60/12; Y02T 10/7055; H01M 10/441
USPC ........................................................ 320/119
See application file for complete search history.

(56) References Cited

U.S. PATENT DOCUMENTS

2001/0022510 A1* 9/2001 Okamura et al. ............. 320/166
2003/0210018 A1* 11/2003 Tscheternigg et al. ....... 320/166

* cited by examiner

*Primary Examiner* — Arun Williams
(74) *Attorney, Agent, or Firm* — FSP LLC

(57) ABSTRACT

A circuit includes a series arrangement of capacitors and a balancing circuit coupled to the series arrangement of capacitors, the balancing circuit having drive circuits each coupled at a node in the series arrangement at which two of the capacitors are coupled in series. The drive circuit includes an output stage having switches arranged to either push or pull current from a drive circuit output depending on the state of the switches.

15 Claims, 5 Drawing Sheets

ACTIVE VOLTAGE BALANCING OF SERIES CAPACITOR ARRANGEMENT

BACKGROUND

The useful lifetime of a capacitive power storage device is affected by the voltage level stored on the capacitor(s) of the device. If capacitors in a series circuit configuration are not voltage balanced, some may wear out sooner than others. FIG. 1 shows a conventional circuit to balance (equalize) the voltage across capacitors $C_1$ and $C_2$ in series.

A disadvantage of this circuit is that resistor $R_B$ has to be selected to provide significant current draw $I_{B1}$ and $I_{B2}$ in order to achieve acceptable voltage equalization. However, a small value for $R_B$ causes larger power consumption.

Another disadvantage of this circuit is that the leakage current $I_{L1}$ and $I_{L2}$ of each capacitor is influenced by temperature, making it difficult to determine the difference between each capacitor's leakage current. Another disadvantage is that leakage current increases as the capacitors age, making the circuit less and less effective with time. Yet another disadvantage is that it takes a long time to balance the capacitor voltages. This reduces the useful life time of the capacitors especially in temperature environments.

A circuit such as the one described in co-assigned application no. US 20120224445 functions better than the passive voltage balance circuit of FIG. 1. However, there are drawbacks to such a circuit. For example, it is difficult to eliminate the side effects of "firmware halts" of the circuit in systems utilizing the capacitors for power, especially when balancing is underway. Second, it is difficult to balance multiple capacitors in series because the software of said systems typically executes step by step, instead of in parallel as the balancing hardware does.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/ or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

DETAILED DESCRIPTION OF PARTICULAR EMBODIMENTS

Figure 2:
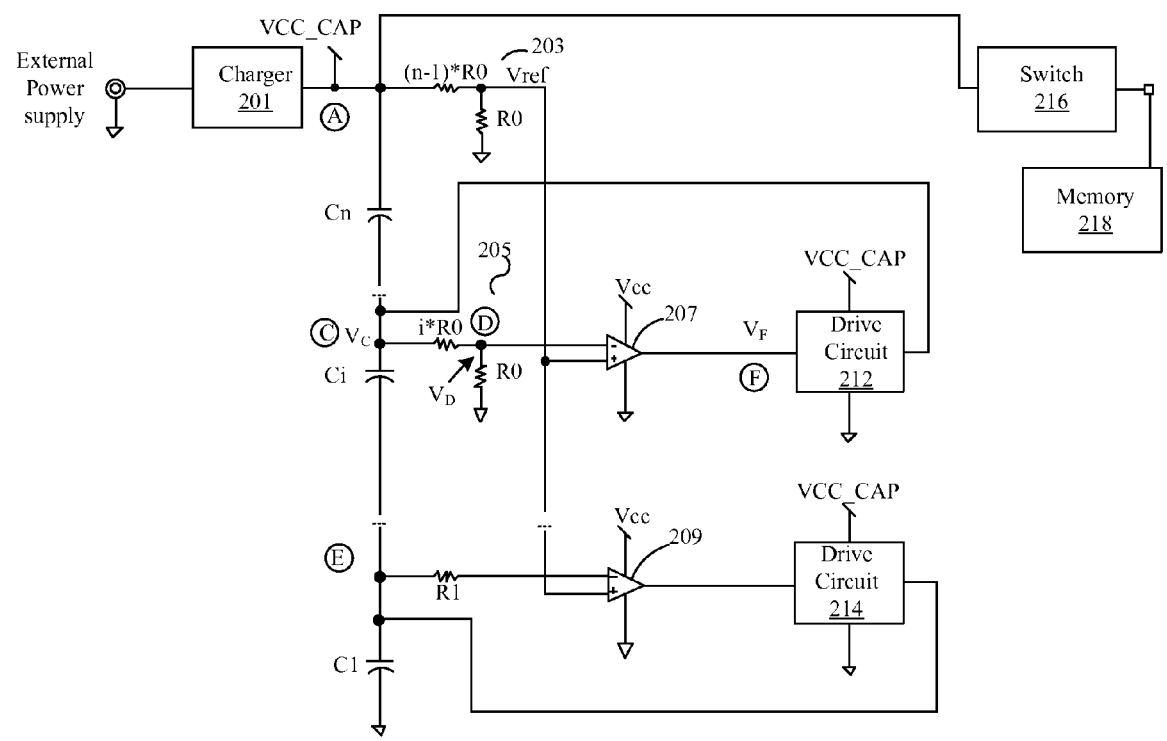
FIG. 2 is an improved balancing circuit for capacitors arranged in series.

Referring to FIG. 2, a resistor divided circuit 203 on node A divides the power supply output voltage VCC_CAP to form the reference voltage Vref. The voltage Vref is provided to the positive input of each of comparators 207, 209. Vref is set by the resistors $(n-1)R0$, e.g. 200K, and R0, e.g. 50K, to $(1/n)$*VCC_CAP.

The resistor divided circuit 205 at node C, e.g. 300K/100K, divides the voltage Uc on capacitor $C_i$ (e.g., 22 F) to form the voltage provided to the negative input of comparator 207. A similar divider circuit may be located at each capacitor node in the series arrangement. The divided voltage value at node D is $(1/i)$*Vci, where Vci is the voltage on capacitor Ci. When i=1, the voltage provided to the negative input of the associated comparator via resistor R1 (e.g., 100K) is Vc1. Not shown but potentially present are capacitors shunting each comparator input to ground, e.g. 1 nF.

There are n−1 comparators. The comparators compare the feedback voltage for $C_1$ to $C_{n-1}$ with Vref. The drive circuits 212, 214 charge or discharge the voltage on $C_1$ to $C_{n-1}$ according the signals sent out by the comparators 207, 209. Consider the voltage on $C_i$ as an example. $V_c$ is the voltage on node C, $V_D$ is the voltage on node D, and so on. The circuit will maintain:

$$Vc=(i/n)VCC\_CAP=i*Vref$$

If Vc<i*Vref, $V_D$<Vref. $V_F$ will be high. Drive circuit 212 will output a positive current (source current) to charge the capacitors between node C and ground ($C_1 \ldots C_i$). If $V_C$>i*Vref, drive circuit 212 will output negative current (sink) to discharge the capacitors between node C and ground ($C_1 \ldots C_i$).

The leakage current of the capacitors doesn't influence the circuit's performance. The precision of the circuit is determined by the precision of the dividing resistors (R0 multiples) and their temperature characteristics. The power consumption of the circuit is mainly determined by the dividing resistors and is typically small (the divided resistors can be 100 KΩ), and by the comparators 207, 209.

The switch 216 may be used to switch the output power of the circuit between primary power from an external system, and backup power from the capacitors C1 . . . Ci in the event primary power fails or is disconnected. Circuits that may be powered from the backup power when primary power fails include, in one implementation, memory circuits 218.

Figure 3:
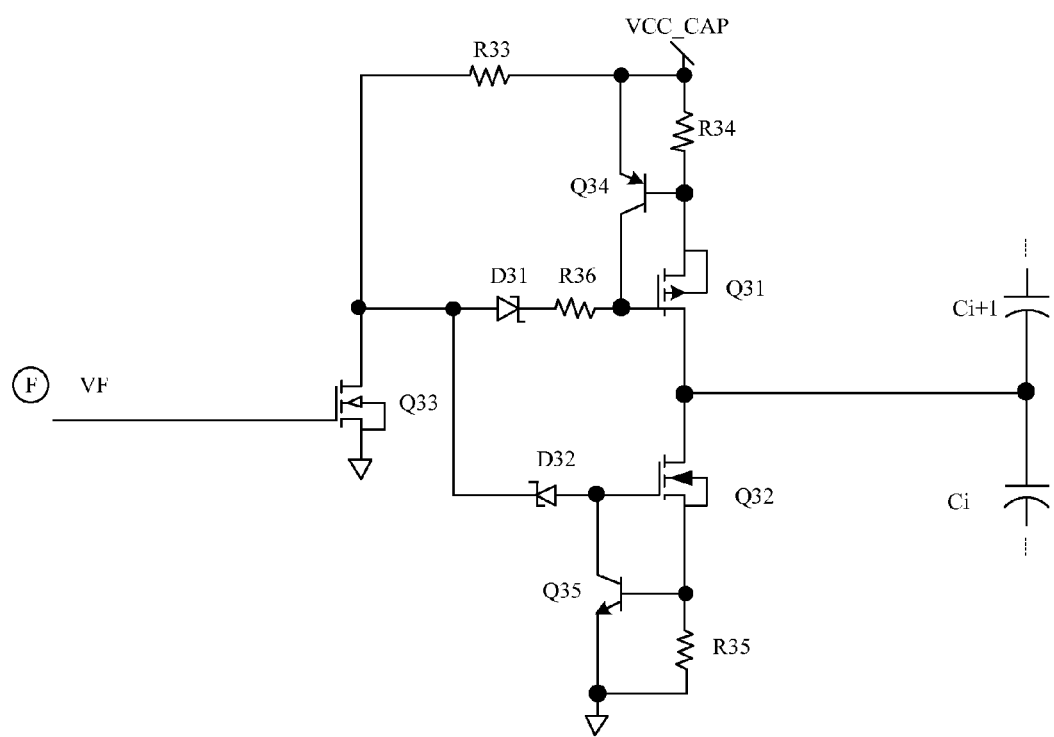
FIG. 3 illustrates an embodiment of a drive circuit for the balancing circuit of FIG. 2.

Referring to FIG. 3, when the comparator 212 outputs a high voltage, Q33 is closed. Q33 closed makes Q32 open and Q31 close. The voltage VCC_CAP causes source current through Q31, Q34 and R34 (e.g., 4.7 ohms). When the comparator 212 outputs low voltage, Q33 is open. Q33 open makes Q31 open and Q32 close. Vc discharges through R36, Q32 and Q35. R34 and Q34 form a circuit to limit the output source current. R35 (e.g., 4.7 ohms) and Q35 form a circuit to limit the output sink current. D31 and D32 are zener and/or other components that prevent both Q31 and Q32 from closing at the same time during Q33 switching. Examples for R33 and R36 are 100 KOhms for each.

The following balancing example applies to a series arrangement of five capacitors having a 10V total charge across the full series, and limited source current and sink currents of 150 mA. In this example C1=C2 . . . =C5=22 F. At the beginning of the example, one capacitor (Ci) is unbalanced, with a voltage across its terminals equal to 2.5V. A balanced voltage on Ci of 2V is desired.

The current is limited to I=150 mA, so the time to balance the capacitor voltage is $$t = C_i \frac{\Delta U_{ci}}{I} = \frac{22 * 0.5}{0.15} = 74(s)$$

Figure 1:
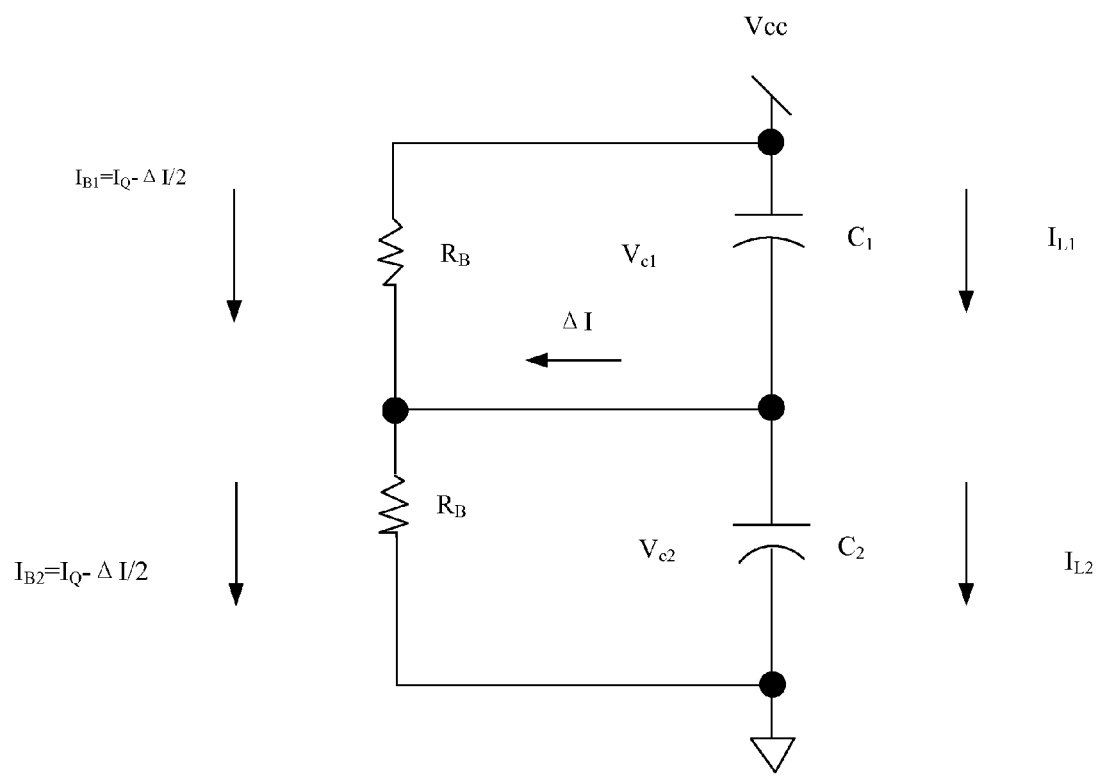
FIG. 1 is a diagram of a prior art circuit for balancing the voltages on capacitors arranged in series.

This example circuit will balance the series capacitor arrangement after approximately 74 seconds. This compares with the passive balancing of the circuit of FIG. 1 which may take around three hours to complete.

A P-channel MOSFET or other switch may be used to shut off the power supply to the comparators in the drive circuits under certain conditions, for example while using the capacitors as a backup power source. When a primary power source (a power source that does not use power from the capacitors) is unavailable, active balancing of the capacitors may be suspended. In one implementation the power supply of the comparators 207, 209 is provided from a (primary) power supply external to a module that includes the capacitors C1 . . . Ci. In other words, the capacitors C1 . . . Ci, comparators 207, 209, and drive circuits 212, 214 are part of a package with a modular interface to a larger system, which may be installed and removed from the larger system (host) as a pluggable module package. The primary supply is provided by the host into the module to power components such as volatile and nonvolatile memory, and is the same power supply that the capacitors are designed to replace as a backup power source when the primary supply fails or is disconnected from the module. Thus in one implementation, the comparators are powered from the primary power source from outside the module, and do not receive backup power from the capacitors when primary power fails, while other module components may receive backup power from the capacitors when primary power fails or in disconnected.

The drive circuits continually operate to charge and discharge each capacitor in the series capacitor arrangement to keep the capacitor voltages equal to one another within an acceptable tolerance. The balancing accuracy depends on the tolerance of the dividing resistors R0 and on the comparator's operating parameters. One aspect of this design is that the switches in the drive circuits generate heat when they are operated.

Figure 4:
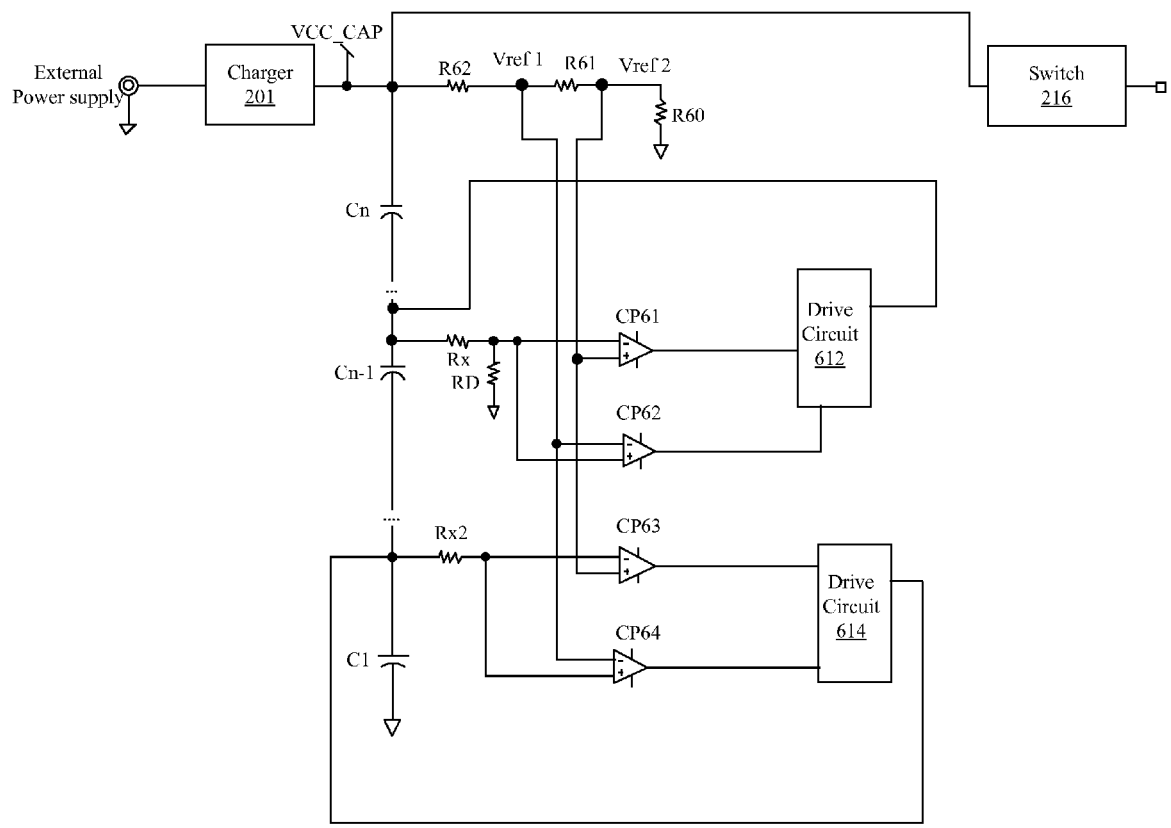
FIG. 4 and FIG. 5 illustrate, respectively, an alternate embodiment of a balancing circuit and a drive circuit for a series capacitor arrangement.
Figure 5:
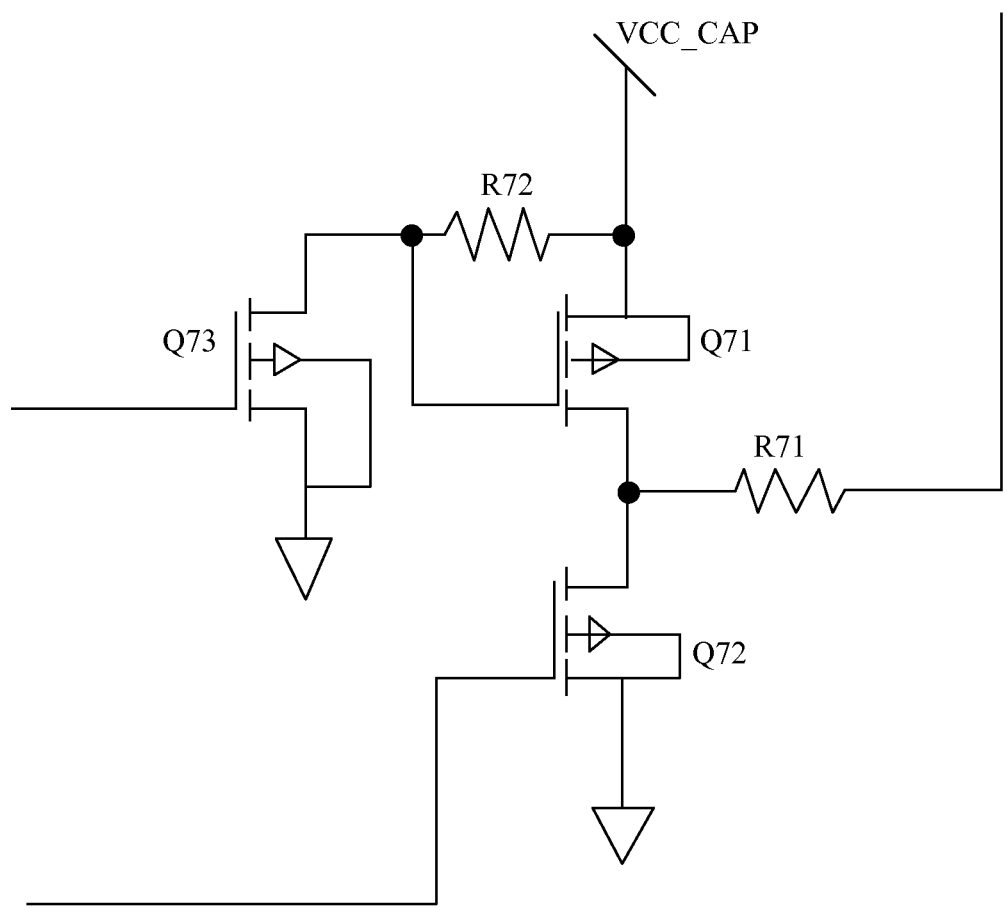

FIG. 4-5 illustrate an implementation of a balancing circuit for a series capacitor arrangement in which two reference voltages are obtained by dividing the voltage Vcc_cap. Resistors R62, R61, and R60 form a two-way voltage divider, creating two reference voltages Vref1 and Vref2 from Vcc-cap. For example, Vref1=(1+0.5%)*Vref and Vref2=(1−0.5%)*Vref, where Vref=Vcc_cap in this example. Let V be the voltage Ci. If V>Vref1*i, comparator Cp62 outputs a high voltage and comparator Cp61 outputs a low voltage. Switch Q71 opens and switch Q72 closes to discharge the voltage of Ci. If V<Vref2*i, comparator Cp61 outputs a high voltage and comparator Cp62 outputs a low voltage. Switch Q71 closes and switch Q72 opens to charge the voltage of capacitor C1. If Vref2*i<V<Vref1*i, then both comparator Cp61 and comparator Cp62 output low voltages and both switches Q71 and Q72 open. The voltage on capacitor C1 remains unchanged.

Rx2 is a current limited resistor, e.g. 100 Kohm. RD and RX form a voltage divider. RD is for example 100 Kohm. The value selected for Rx will typically vary with the node of the capacitor arrangement to which it is coupled. For node Ci, Rx=(i−1)*RD. Capacitances (e.g., 1 nF) may shunt each input of the comparators to ground.

The embodiment illustrated in FIG. 4-5 utilizes twice the number of comparators as the embodiment illustrated in FIG. 2-3, but does not require the utilization of diodes. Although the illustrated embodiment uses resistors to limit current in the circuits, it would be understood by those skilled in the art that other current limiting circuits with perhaps more advantageous features as are known in the art may be used to provide a faster balancing of the circuits or other advantages (such as lower current consumption). The balancing circuits and in particular the switches in the embodiment illustrated in FIG. 4-5 do not operate when an associated capacitor in the series capacitor arrangement is in balance. The switches do not switch as frequently as they do in the embodiment illustrated in FIG. 2-3, so that heat is less of a concern.

The resistors R62, R61 and R60 construct a circuit to generate Vref1 and Vref2. Vref1 is the maximum and Vref2 is the minimum voltage for balancing the capacitors. If the voltage on any capacitor drifts outside this range, the drive circuits activate to balance the capacitors' voltages. The range of Vref1 and Vref2 may be designed $$Vref1 = (1+\epsilon\%)VCC_{CAP}/N$$

$$Vref2 = (1-\epsilon\%)VCC_{CAP}/N$$

Where $\epsilon$ % can be 0.5%, 1%, 2% according the tolerance setting of the circuit (as set by the resistors R60-R62).

Implementations and Alternatives

A circuit may be designed in which operational amplifiers (op amps) are utilized to balance the capacitor series arrangement directly. However, there are several disadvantages to this approach. Many op-amps do not have sink and source current capability, or if they do, such capability is limited. This makes it impractical to use many types of op amps to directly drive current into or sink current from the capacitors. Furthermore, op amps typically cannot deliver or sink current fast enough for many balancing applications or requirements, especially at higher temperatures. Op-amps would typically need to utilize a current-limiting resistor that would lower their efficiency as a source or sink of balancing current in many cases. Further still, using op-amps to directly balance the capacitors might require that the power supply for the op-amps be at least as high as the overall voltage across the series arrangement of capacitors, which might be a prohibitively high power supply voltage for many applications.

The techniques and procedures described herein may be implemented via logic distributed in one or more computing devices. The particular distribution and choice of logic is a design decision that will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A circuit comprising:
   a series arrangement of capacitors;
   a balancing circuit coupled to the series arrangement of capacitors, the balancing circuit comprising a plurality of drive circuits, each of the plurality of drive circuits coupled at a node in the series arrangement of capacitors at which two of the capacitors of the series arrangement of capacitors are coupled in series, each of the plurality of drive circuits comprising an output stage having switches arranged to either push or pull a drive circuit output current depending on a state of the switches; and
   each of the plurality of drive circuits comprising a drive circuit input being a same node of the series arrangement of capacitors as a drive circuit output.

2. The circuit of claim 1, the balancing circuit comprising a comparator comprising a first comparator input coupled to receive the drive circuit output and a second comparator input coupled to receive a reference voltage.

3. The circuit of claim 2 the balancing circuit comprising a plurality of comparators, the comparators comprising a first comparator coupled to receive a first reference voltage, and a second comparator coupled to receive a second reference voltage.

4. The circuit of claim 2, wherein each of the first comparator input and the second comparator input are generated by one or more voltage divider circuit.

5. The circuit of claim 2, wherein the comparator is powered by a power supply independent of the series arrangement of capacitors.

6. The circuit of claim 5, wherein the series arrangement of capacitors and the balancing circuit are packaged as a pluggable module with a module output terminal that is switchable between a power supply voltage provided from external to the pluggable module, and an internal power supply voltage generated from the series arrangement of capacitors.

7. The circuit of claim 6, the module further comprising first internal module components powered by the series arrangement of capacitors in the event of a power failure, and second internal module components comprising a plurality of comparators that are not powered by the series arrangement of capacitors in the event of the power failure.

8. The circuit of claim 7, the first internal module components comprising memory circuits.

9. A method comprising:
balancing a series arrangement of capacitors using a plurality of drive circuits, each of the plurality of drive circuits coupled at a corresponding node of a plurality of nodes in the series arrangement of capacitors, each corresponding node corresponding to one of the plurality of drive circuits, each corresponding node being a node at which two of the capacitors of the series arrangement of capacitors are coupled in series, each of the plurality of drive circuits comprising an output stage having switches arranged to either push or pull a drive circuit output current depending on a state of the switches; and
utilizing the corresponding node to provide both of a drive circuit input and a drive circuit output for each of the plurality of drive circuits.

10. The method of claim 9, further comprising:
comparing a fraction of the drive circuit output with a reference voltage fraction.

11. The method of claim 10, further comprising:
generating the fraction of the drive circuit output using a first voltage divider circuit and the reference voltage fraction using a second voltage divider circuit.

12. The method of claim 10, further comprising:
powering a comparator to do the comparing using a power supply independent of the series arrangement of capacitors.

13. The method of claim 12, further comprising:
packaging the series arrangement of capacitors and a circuit to perform the balancing as a pluggable module with a module output terminal that is switchable between a power supply voltage provided from external to the pluggable module, and an internal power supply voltage generated from the series arrangement of capacitors.

14. The method of claim 13, further comprising:
powering first internal module components of the pluggable module with the internal power supply voltage generated from the series arrangement of capacitors during a power failure; and
in the event of the power failure, not powering with the internal power supply voltage generated from the series arrangement of capacitors second internal module components of the pluggable module comprising a plurality of comparators for comparing the fraction of the drive circuit output and the reference voltage fraction.

15. The method of claim 14, the first internal module components comprising memory circuits.

* * * * *